(12) United States Patent
Ho et al.

(10) Patent No.: US 6,501,660 B1
(45) Date of Patent: Dec. 31, 2002

(54) RELIABLE CARD DETECTION IN A CPCI SYSTEM

(75) Inventors: Raymond K. Ho, San Jose, CA (US); Victor E. Jochiong, Mill Valley, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/887,807

(22) Filed: Jun. 22, 2001

(51) Int. Cl.$^7$ .................................................. H05K 5/00
(52) U.S. Cl. ........................ 361/752; 361/724; 361/726; 361/800; 361/797; 710/102; 710/103; 710/105
(58) Field of Search ............................... 361/752, 724, 361/726, 714, 816, 797, 800, 796; 710/100, 101, 102, 105, 103, 301, 107, 302; 713/324, 340, 330

(56) References Cited

U.S. PATENT DOCUMENTS

| | | | | |
|---|---|---|---|---|
| 5,568,610 A | * | 10/1996 | Brown | 439/955 |
| 5,636,347 A | * | 6/1997 | Muchnick et al. | 710/302 |
| 5,809,330 A | * | 9/1998 | Ninomiya | 395/829 |
| 5,974,489 A | * | 10/1999 | Williams et al. | 710/302 |
| 6,125,417 A | * | 9/2000 | Bailis et al. | 710/302 |
| 6,185,645 B1 | * | 2/2001 | Klein et al. | 710/302 |

* cited by examiner

*Primary Examiner*—David Martin
*Assistant Examiner*—Hung Bui
(74) *Attorney, Agent, or Firm*—O'Melveny & Myers LLP

(57) ABSTRACT

A CPCI system is adapted to reliably detect the presence of all front cards, whether hot swappable or not. The system includes a line that is used to detect the presence of a front card. The line is connected to a connector-pin of a slot. The line is also connected to a pull-up resistor so that when a front card is not inserted in the slot, the line has a high value. When a front card is inserted in the slot, the connector-pin mates with a corresponding connector-pin in the front card. The corresponding connector-pin is connected to a ground layer of the front card so that the line becomes grounded. The voltage level on the line is input to a register that outputs a high or low to a circuit for detecting the presence of a front card. The circuit may be a hot swap controller, a CPU or a status indicator. Accordingly, depending on the output of the register, the circuit reliably determines whether a front card is present in the particular slot. The reliable detection of all front cards provides to the operating system of the CPU a more accurate view of the hardware configuration.

20 Claims, 17 Drawing Sheets

402d

| | | | | | | | |
|---|---|---|---|---|---|---|---|
| 22 | GND | XXX | XXX | XXX | XXX | XXX | GND | |
| 21 | GND | XXX | XXX | XXX | XXX | XXX | GND | |
| 3–20 | GND | YYY | YYY | YYY | YYY | YYY | GND | 404e |
| 2 | GND | XXX | XXX | XXX | XXX | XXX | GND | |
| 1 | GND | XXX | XXX | XXX | XXX | XXX | GND | |
| 22 | GND | XXX | XXX | XXX | XXX | XXX | GND | |
| 21 | GND | XXX | XXX | XXX | XXX | XXX | GND | |
| 3–20 | GND | YYY | YYY | YYY | YYY | YYY | GND | 404d |
| 2 | GND | XXX | XXX | XXX | XXX | XXX | GND | |
| 1 | GND | XXX | XXX | XXX | XXX | XXX | GND | |
| 22 | GND | XXX | XXX | XXX | XXX | XXX | GND | |
| 21 | GND | XXX | XXX | XXX | XXX | XXX | GND | |
| 3–20 | GND | YYY | YYY | YYY | YYY | YYY | GND | 404c |
| 2 | GND | XXX | XXX | XXX | XXX | XXX | GND | |
| 1 | GND | XXX | XXX | XXX | XXX | XXX | GND | |
| 22 | GND | GA4 | GA3 | GA2 | GA1 | GA0 | GND | |
| 21 | GND | CLK6 | GND | RSV | RSV | RSV | GND | |
| 3–20 | GND | YYY | YYY | YYY | YYY | YYY | GND | 404b |
| 2 | GND | CLK2 | CLK3 | SYSEN# | GNT2# | REQ3# | GND | |
| 1 | GND | CLK1 | GND | REQ1# | GNT1# | REQ2# | GND | |
| 16–22 | GND | YYY | YYY | YYY | YYY | YYY | GND | |
| 15 | GND | 3.3V | FRAME# | IRDY# | BD_SELECT# | TRDY# | GND | |
| 6–14 | GND | YYY | YYY | YYY | YYY | YYY | GND | |
| 5 | GND | BRSVP1A5 | BRSVP1B5 | BD_RESET# | GND | GNT# | GND | 404a |
| 4 | GND | BRSVP1B5 | BD_HEALTHY# | V(I/O) | INTP | INTS | GND | |
| 2–3 | GND | YYY | YYY | YYY | YYY | YYY | GND | |
| 1 | GND | 5v | –12v | TRST# | +12v | 5v | BD_DETECT# | |
| PIN | Z | A | B | C | D | E | F | |

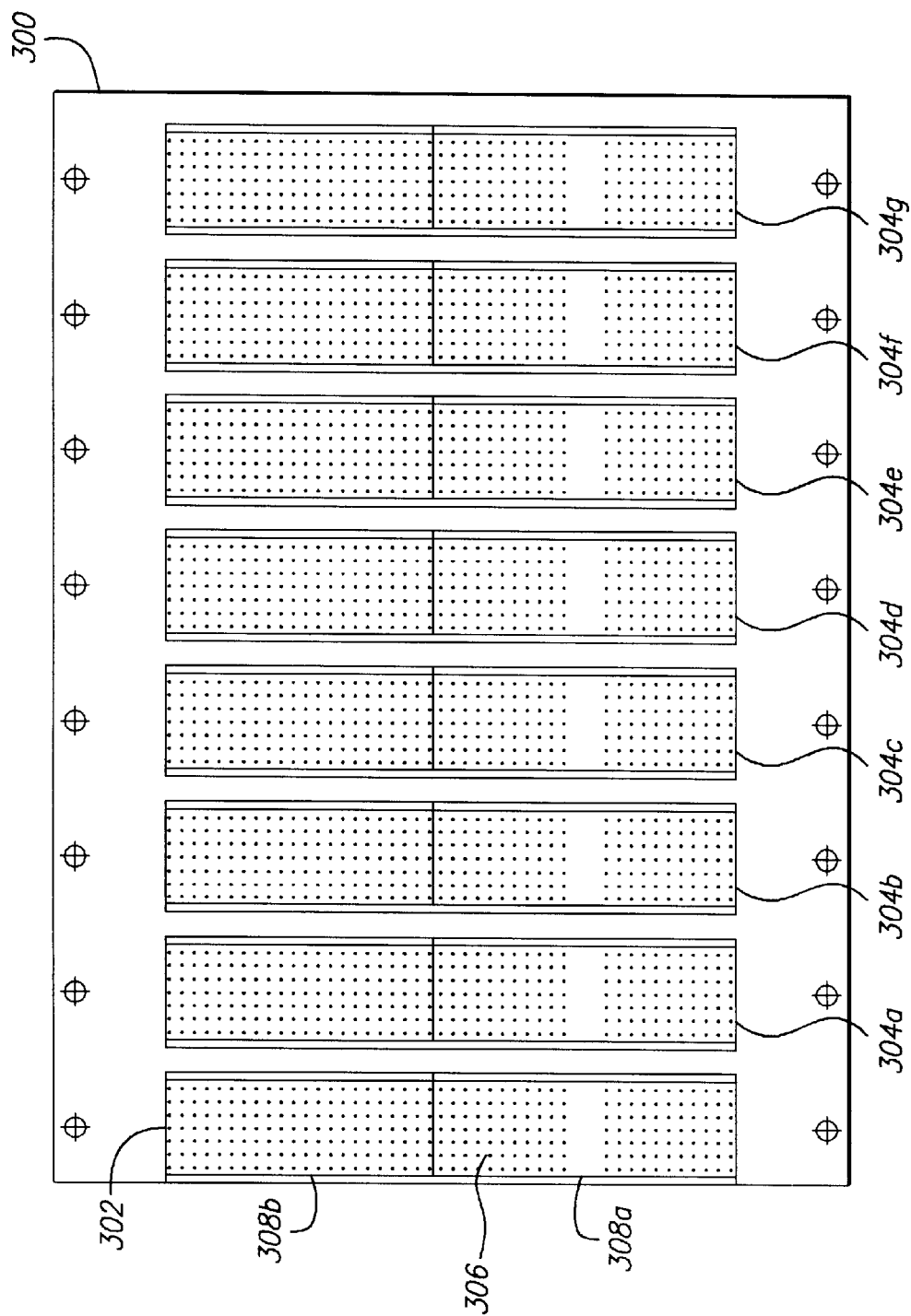

FIG. 6(a) PRIOR ART

| PIN | Z | A | B | C | D | E | F | |
|---|---|---|---|---|---|---|---|---|
| 22 | GND | XXX | XXX | XXX | XXX | XXX | GND | 404e |
| 21 | GND | XXX | XXX | XXX | XXX | XXX | GND | |
| 3-20 | GND | YYY | YYY | YYY | YYY | YYY | GND | |
| 2 | GND | XXX | XXX | XXX | XXX | XXX | GND | |
| 1 | GND | XXX | XXX | XXX | XXX | XXX | GND | |
| 22 | GND | XXX | XXX | XXX | XXX | XXX | GND | 404d |
| 21 | GND | XXX | XXX | XXX | XXX | XXX | GND | |
| 3-20 | GND | YYY | YYY | YYY | YYY | YYY | GND | |
| 2 | GND | XXX | XXX | XXX | XXX | XXX | GND | |
| 1 | GND | XXX | XXX | XXX | XXX | XXX | GND | |
| 22 | GND | XXX | XXX | XXX | XXX | XXX | GND | 404c |
| 21 | GND | XXX | XXX | XXX | XXX | XXX | GND | |
| 3-20 | GND | YYY | YYY | YYY | YYY | YYY | GND | |
| 2 | GND | XXX | XXX | XXX | XXX | XXX | GND | |
| 1 | GND | XXX | XXX | XXX | XXX | XXX | GND | |
| 22 | GND | GA4 | GA3 | GA2 | GA1 | GA0 | GND | 404b |
| 21 | GND | CLK6 | GND | RSV | RSV | RSV | GND | |
| 3-20 | GND | YYY | YYY | YYY | YYY | YYY | GND | |
| 2 | GND | CLK2 | CLK3 | SYSEN# | GNT2# | REQ3# | GND | |
| 1 | GND | CLK1 | GND | REQ1# | GNT1# | REQ2# | GND | |
| 16-22 | GND | 3.3v | FRAME# | IRDY# | BD_SELECT# | TRDY# | GND | 404a |
| 15 | GND | YYY | YYY | YYY | YYY | YYY | GND | |
| 6-14 | GND | BRSVP1A5 | BRSVP1B5 | BD_RESET# | GND | GNT# | GND | |
| 5 | GND | BRSVP1B5 | BD_HEALTHY# | V(I/O) | INTP | INTS | GND | |
| 4 | GND | YYY | YYY | YYY | YYY | YYY | GND | |
| 2-3 | GND | 5v | -12v | TRST# | +12v | 5v | GND | |
| 1 | GND | | | | | | | |
| PIN | Z | A | B | C | D | E | F | |

402d

FIG. 6(b) _PRIOR ART_

| PIN | F | E | D | C | B | A | Z | Block |
|-----|---|---|---|---|---|---|---|-------|
| 22 | GND | XXX | XXX | XXX | XXX | XXX | GND | 408e |
| 21 | GND | XXX | XXX | XXX | XXX | XXX | GND | 408e |
| 3-20 | GND | YYY | YYY | YYY | YYY | YYY | GND | 408e |
| 2 | GND | XXX | XXX | XXX | XXX | XXX | GND | 408e |
| 1 | GND | XXX | XXX | XXX | XXX | XXX | GND | 408e |
| 22 | GND | XXX | XXX | XXX | XXX | XXX | GND | 408d |
| 21 | GND | XXX | XXX | XXX | XXX | XXX | GND | 408d |
| 3-20 | GND | YYY | YYY | YYY | YYY | YYY | GND | 408d |
| 2 | GND | XXX | XXX | XXX | XXX | XXX | GND | 408d |
| 1 | GND | XXX | XXX | XXX | XXX | XXX | GND | 408d |
| 22 | GND | XXX | XXX | XXX | XXX | XXX | GND | 408c |
| 21 | GND | XXX | XXX | XXX | XXX | XXX | GND | 408c |
| 3-20 | GND | YYY | YYY | YYY | YYY | YYY | GND | 408c |
| 2 | GND | XXX | XXX | XXX | XXX | XXX | GND | 408c |
| 1 | GND | XXX | XXX | XXX | XXX | XXX | GND | 408c |
| 22 | GND | GA0 | GA1 | GA2 | GA3 | GA4 | GND | 408b |
| 21 | GND | RSV | RSV | RSV | GND | CLK6 | GND | 408b |
| 3-20 | GND | YYY | YYY | YYY | YYY | YYY | GND | 408b |
| 2 | GND | REQ3# | GNT2# | SYSEN# | CLK3 | CLK2 | GND | 408b |
| 1 | GND | REQ2# | GNT1# | REQ1# | GND | CLK1 | GND | 408b |

| PIN | Z | A | B | C | D | E | F | |
|---|---|---|---|---|---|---|---|---|
| 22 | GND | YYY | YYY | YYY | XXX | XXX | GND | 404e |
| 21 | GND | YYY | YYY | YYY | XXX | XXX | GND | |
| 3-20 | GND | YYY | YYY | YYY | XXX | XXX | GND | |
| 2 | GND | XXX | XXX | XXX | XXX | XXX | GND | |
| 1 | GND | XXX | XXX | XXX | XXX | XXX | GND | |
| 22 | GND | YYY | YYY | YYY | XXX | XXX | GND | 404d |
| 21 | GND | YYY | YYY | YYY | XXX | XXX | GND | |
| 3-20 | GND | YYY | YYY | YYY | XXX | XXX | GND | |
| 2 | GND | XXX | XXX | XXX | XXX | XXX | GND | |
| 1 | GND | XXX | XXX | XXX | XXX | XXX | GND | |
| 22 | GND | YYY | YYY | YYY | XXX | XXX | GND | 404c |
| 21 | GND | YYY | YYY | YYY | XXX | XXX | GND | |
| 3-20 | GND | YYY | YYY | YYY | XXX | XXX | GND | |
| 2 | GND | XXX | XXX | XXX | XXX | XXX | GND | |
| 1 | GND | XXX | XXX | XXX | XXX | XXX | GND | |
| 22 | GND | GA4 | GA3 | GA2 | GA1 | GA0 | GND | 404b |
| 21 | GND | YYY | YYY | RSV | RSV | RSV | GND | |
| 3-20 | GND | CLK6 | GND | YYY | YYY | YYY | GND | |
| 2 | GND | CLK2 | CLK3 | SYSEN# | GNT2# | REQ3# | GND | |
| 1 | GND | CLK1 | GND | REQ1# | GNT1# | REQ2# | GND | |
| 16-22 | GND | YYY | YYY | YYY | YYY | YYY | GND | 404a |
| 15 | GND | 3.3V | FRAME# | IRDY# | BD_SELECT# | TRDY# | GND | |
| 6-14 | GND | YYY | YYY | YYY | YYY | YYY | GND | |
| 5 | GND | BRSVP1A5 | BRSVP1B5 | BD_RESET# | GND | GNT# | GND | |
| 4 | GND | BRSVP1B5 | BD_HEALTHY# | V(I/O) | INTP | INTS | GND | |
| 2-3 | GND | YYY | YYY | YYY | YYY | YYY | GND | |
| 1 | GND | 5v | -12v | TRST# | +12v | 5v | BD_DETECT# | |

FIG. 8(b) 402d

| PIN | Z | A | B | C | D | E | F | |
|---|---|---|---|---|---|---|---|---|
| 22 | GND | XXX | XXX | XXX | XXX | XXX | GND | 404e |
| 21 | GND | XXX | XXX | XXX | XXX | XXX | GND | |
| 3-20 | GND | YYY | YYY | YYY | YYY | YYY | GND | |
| 2 | GND | XXX | XXX | XXX | XXX | XXX | GND | |
| 1 | GND | XXX | XXX | XXX | XXX | XXX | GND | |
| 22 | GND | XXX | XXX | XXX | XXX | XXX | GND | 404d |
| 21 | GND | XXX | XXX | XXX | XXX | XXX | GND | |
| 3-20 | GND | YYY | YYY | YYY | YYY | YYY | GND | |
| 2 | GND | XXX | XXX | XXX | XXX | XXX | GND | |
| 1 | GND | XXX | XXX | XXX | XXX | XXX | GND | |
| 22 | GND | XXX | XXX | XXX | XXX | XXX | GND | 404c |
| 21 | GND | XXX | XXX | XXX | XXX | XXX | GND | |
| 2-20 | GND | YYY | YYY | YYY | YYY | YYY | GND | |
| 1 | GND | XXX | XXX | XXX | XXX | XXX | GND | |
| 16-25 | GND | GA4 | GA3 | GA2 | GA1 | GA0 | GND | 404b |
| 15 | GND | CLK6 | GND | RSV | RSV | RSV | GND | |
| 12-14 | | YYY | KEY AREA | YYY | YYY | YYY | GND | |
| 6-11 | GND | CLK1 | GND | REQ1# | GNT1# | REQ2# | GND | |
| 5 | GND | YYY | YYY | YYY | YYY | YYY | GND | 404a |
| 4 | GND | BRSVP1A5 | BRSVP1B5 | BD_RESET# | GND | GNT# | GND | |
| 2-3 | GND | BRSVP1B5 | BD_HEALTHY# | V(I/O) | INTP | INTS | GND | |
| 1 | GND | YYY | YYY | YYY | YYY | YYY | GND | |
| 1 | GND | 5v | -12v | TRST# | +12v | 5v | BD_DETECT# | |

A row near pin 4 also contains: 3.3V | FRAME# | IRDY# | BD_SELECT# | TRDY# | GND

FIG. 9(a) 200

| PIN | F | E | D | C | B | A | Z | |
|---|---|---|---|---|---|---|---|---|
| 22 | GND | XXX | XXX | XXX | XXX | XXX | GND | 104e |
| 21 | GND | XXX | XXX | XXX | XXX | XXX | GND | |
| 3-20 | GND | YYY | YYY | YYY | YYY | YYY | GND | |
| 2 | GND | XXX | XXX | XXX | XXX | XXX | GND | |
| 1 | GND | XXX | XXX | XXX | XXX | XXX | GND | |
| 22 | GND | XXX | XXX | XXX | XXX | XXX | GND | 104d |
| 21 | GND | XXX | XXX | XXX | XXX | XXX | GND | |
| 3-20 | GND | YYY | YYY | YYY | YYY | YYY | GND | |
| 2 | GND | XXX | XXX | XXX | XXX | XXX | GND | |
| 1 | GND | XXX | XXX | XXX | XXX | XXX | GND | |
| 22 | GND | XXX | XXX | XXX | XXX | XXX | GND | 104c |
| 21 | GND | XXX | XXX | XXX | XXX | XXX | GND | |
| 3-20 | GND | YYY | YYY | YYY | YYY | YYY | GND | |
| 2 | GND | XXX | XXX | XXX | XXX | XXX | GND | |
| 1 | GND | XXX | XXX | XXX | XXX | XXX | GND | |
| 22 | GND | GA0 | GA1 | GA2 | GA3 | GA4 | GND | 104b |
| 21 | GND | RSV | RSV | RSV | GND | CLK6 | GND | |
| 3-20 | GND | YYY | YYY | YYY | YYY | YYY | GND | |
| 2 | GND | REQ3# | GNT2# | SYSEN# | CLK3 | CLK2 | GND | |
| 1 | GND | REQ2# | GNT1# | REQ1# | GND | CLK1 | GND | |
| 16-22 | GND | YYY | YYY | YYY | YYY | YYY | GND | 104a |
| 15 | GND | TRDY# | BD_SELECT# | IRDY# | FRAME# | 3.3V | GND | |
| 6-14 | GND | YYY | YYY | YYY | YYY | YYY | GND | |
| 5 | GND | GNT# | GND | BD_RESET# | BRSVP1B5 | BRSVP1A5 | GND | |
| 4 | GND | INTS | INTF | V(I/O) | BD_HEALTHY# | BRSVPB5 | GND | |
| 2-3 | GND | YYY | YYY | YYY | YYY | YYY | GND | |
| 1 | GND | 5V | 12V | TRST# | -12V | 5V | GND | |
| PIN | F | E | D | C | B | A | Z | |

FIG. 9(b)

| PIN | F | E | D | C | B | A | Z | |
|---|---|---|---|---|---|---|---|---|
| 1 | GND | 5V | 12V | TRST# | -12V | 5V | GND | 104a |
| 2-3 | GND | YYY | YYY | YYY | YYY | YYY | GND | |
| 4 | GND | INTS | INTF | V(I/O) | BD_HEALTHY# | BRSVPB5 | GND | |
| 5 | GND | GNT# | GND | BD_RESET# | BRSVP1B5 | BRSVP1A5 | GND | |
| 6-11 | GND | YYY | YYY | YYY | YYY | YYY | GND | |
| 21-14 | | | | KEY AREA | | | | |
| 15 | GND | TRDY# | BD_SELECT# | IRDY# | FRAME# | 3.3V | GND | 104b |
| 16-25 | GND | YYY | YYY | YYY | GND | GND | GND | |
| 1 | GND | REQ2# | GNT1# | REQ1# | GND | CLK1 | GND | |
| 2 | GND | YYY | YYY | YYY | YYY | YYY | GND | 104c |
| 3-20 | GND | XXX | XXX | XXX | XXX | XXX | GND | |
| 21 | GND | RSV | RSV | RSV | GND | CLK6 | GND | |
| 22 | GND | GA0 | GA1 | GA2 | GA3 | GA4 | GND | |
| 1 | GND | YYY | YYY | YYY | YYY | YYY | GND | |
| 2 | GND | XXX | XXX | XXX | XXX | XXX | GND | 104d |
| 3-20 | GND | XXX | XXX | XXX | XXX | XXX | GND | |
| 21 | GND | YYY | YYY | YYY | YYY | YYY | GND | |
| 22 | GND | XXX | XXX | XXX | XXX | XXX | GND | |
| 1 | GND | YYY | YYY | YYY | YYY | YYY | GND | |
| 2 | GND | XXX | XXX | XXX | XXX | XXX | GND | 104e |
| 3-20 | GND | XXX | XXX | XXX | XXX | XXX | GND | |
| 21 | GND | YYY | YYY | YYY | YYY | YYY | GND | |
| 22 | GND | XXX | XXX | XXX | XXX | XXX | GND | |

200

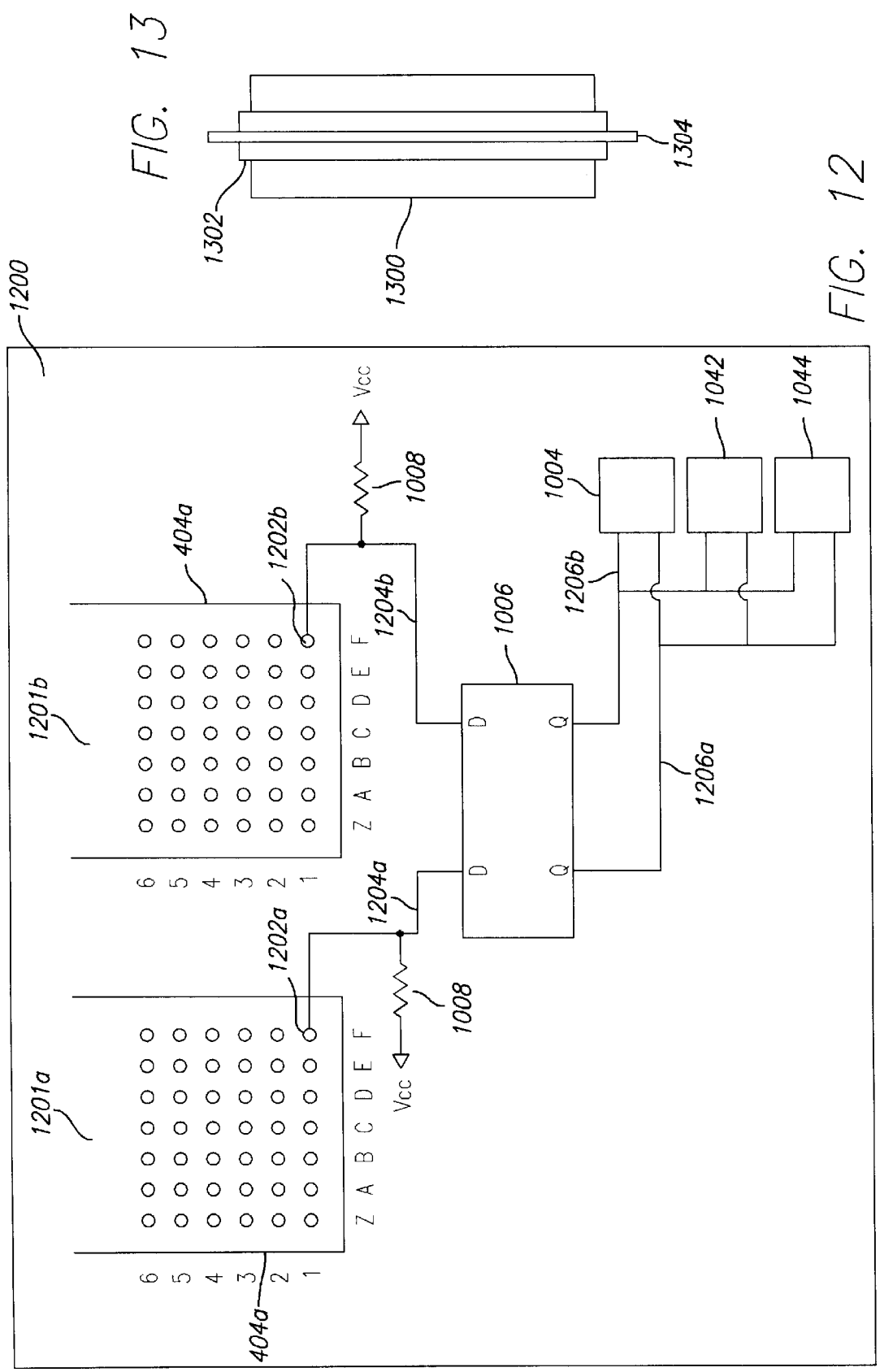

RELIABLE CARD DETECTION IN A CPCI SYSTEM

BACKGROUND OF THE INVENTION

1. Field of the Invention

The present invention relates to Compact Peripheral Component Interconnect ("CPCI") computer systems. More particularly, the present invention relates to providing reliable card detection in a CPCI system.

2. Description of Related Art

CPCI is a high performance industrial bus based on the standard PCI electrical specification in rugged 3U or 6U Eurocard packaging. CPCI is intended for application in telecommunications, computer telephony, real-time machine control, industrial automation, real-time data acquisition, instrumentation, military systems or any other application requiring high speed computing, modular and robust packaging design, and long term manufacturer support. Because of its extremely high speed and bandwidth, the CPCI bus is particularly well suited for many high-speed data communication applications such as servers, routers, converters, and switches.

Compared to standard desktop PCI, CPCI supports twice as many PCI slots (8 versus 4) and offers a packaging scheme that is much better suited for use in industrial applications. Conventional CPCI cards are designed for front loading and removal from a card cage. The cards are firmly held in position by their connector, card guides on both sides, and a faceplate that solidly screws into the card cage. Cards are mounted vertically allowing for natural or forced air convection for cooling. Also, the pin-and-socket connector of the CPCI card is significantly more reliable and has better shock and vibration characteristics than the card edge connector of the standard PCI cards.

Conventional CPCI defines a backplane environment that is limited to eight slots. More specifically, the bus segment of the conventional CPCI system is limited to eight slots, which includes a system slot and peripheral slots. The system slot provides the clocking, arbitration, configuration, and interrupt processing for up to seven peripheral slots.

The newest trend in CPCI systems is to support hot swappable front cards. Hot swappability is the ability to unplug and plug a card while the system remains on. In other words, hot swappability is the ability to exchange cards while the system is running so that there is no need to reboot the system. The CPCI Hot Swap/HA specification defines, among other things, that the connector-pin P1-D15 (in the backplane) and connector-pin J1-D15 (in the front card) be designated as a BD_SELECT# line. The BD_SELECT# line is used to detect the insertion of a hot swappable front card into a slot of the backplane, and to allow the powering-up/down of the card by the hot swap controller. The specification further defines the dynamic interface protocol between the system's hot swap controller and the card through this line. However, if a non-hot swappable front card, which is non-compliant to the Hot Swap/HA Specification, is inserted in a slot of the backplane, the hot swap controller in the conventional system would not know of the insertion of the non-compliant front card. In other words, the conventional hot swap controller cannot detect the presence of non-hot swappable front cards so that an accurate hardware configuration would not be known to the operating system if non-hot swappable front cards were present.

Accordingly, it would be advantageous to provide a CPCI system that can reliably detect the insertion of all front cards, whether hot swappable or not.

SUMMARY OF THE INVENTION

The present invention relates to providing a CPCI system that is adapted to reliably detect the presence of all front cards, whether hot swappable or not. The reliable detection of all front cards provides the operating system with a more accurate view of the hardware configuration.

The present invention has a line that is used to detect the presence of a front card. The line is connected to a connector-pin in a connector of a slot. The line is also connected to a pull-up resistor so that when a front card is not inserted in the slot, the line has a high value. When a front card is inserted in the slot, the connector-pin mates with a corresponding connector-pin in the front card. Note that the corresponding connector-pin is connected to a ground layer of the front card so that the line becomes grounded. The voltage level on the line is input to a register that outputs a high or low to a circuit for detecting the presence of a front card. The circuit may be a hot swap controller, a CPU or a status indicator. Accordingly, depending on the output of the register, the circuit determines whether a front card is present in the particular slot.

An embodiment of the invention includes a computer system including a circuit board, with the system comprising a slot coupled to a front side of the circuit board. A plurality of connectors is affixed to the circuit board in alignment with the slot, with the plurality of connectors including a first connector. A plurality of connector-pins are extended in a direction substantially perpendicular to and away from the circuit board, and has a column and row arrangement within the connectors. The first connector includes first and second connector-pins. A register having an input line and an output line is provided, with the input line connected to a voltage source through a pull-up resistor, and the first connector-pin connected to the input line of the register. A circuit having an input terminal is connected to the first connector-pin through the register, with the register connected to the input terminal of the circuit via the output line of the register, wherein depending on a voltage level of the first connector-pin, the register transmits one of a high and low signal to the input terminal of the circuit whereby the circuit detects a presence of a front card in the slot based on said one of a high and low signal.

Another embodiment of the invention includes a circuit board having a front side, with the circuit board comprising a plurality of slots coupled to the front side of the circuit board. A plurality of connectors is disposed within each of the plurality of slots and including a first connector in each of the slots, with the respective first connectors of the slots including a first connector-pin and a second connector-pin. A plurality of connector-pins is disposed in an arrangement of a plurality of columns and rows in each of the connectors, with the plurality of columns including first and second columns. The connector-pins in the first and second columns are connected to a ground layer of the circuit board, except for the first connector-pins in the first connectors. An input/output device has a plurality of input lines and output lines, each of the input lines are connected to a voltage source through a pull-up resistor, and the first connector-pins in each of the slots are connected to the input/output device via the respective input lines. A circuit has a plurality of input terminals and is connected to the first connector-pins through the input/output device. The input terminals of the circuit are connected to the output lines of the input/output device, wherein depending on voltage levels of the respective first connector-pins, the input/output device transmits respective signals to the corresponding input terminals of the circuit whereby the circuit detects a presence of a front card in corresponding ones of the slots depending on the respective signals.

A more complete understanding of the present invention will be afforded to those skilled in the art, as well as a realization of additional advantages and objects thereof, by a consideration of the following detailed description of the embodiment. Reference will be made to the appended sheets of drawings, which will first be described briefly.

BRIEF DESCRIPTION OF THE DRAWINGS

FIG. 3 is a front view of a conventional 3U backplane having eight slots with two connectors each;

FIG. 6(a) shows a front view of a conventional pin out arrangement of the connectors of a slot;

FIG. 6(b) shows a back view of a conventional pin out arrangement of connectors of a slot;

FIG. 8(a) shows a front view of the pin out arrangement of the connectors of a slot according to an embodiment of the invention;

FIG. 8(b) shows a modification of the pin out arrangement of FIG. 8(a) according to another embodiment of the invention;

FIG. 9(a) shows a front card having a pin out arrangement corresponding to the pin out arrangement shown in FIG. 8(a);

FIG. 9(b) shows a front card having a pin out arrangement corresponding to the pin out arrangement shown in FIG. 8(b);

FIG. 12 shows a plurality of slots having respective BD_DETECT# pins connected to respective inputs of a register for detecting the presence of front cards according to an embodiment of the invention; and FIG. 13 shows a side view of a register in the form of a front card according to an embodiment of the invention.

DETAILED DESCRIPTION

The present invention relates to a CPCI system that reliably detects the presence of front cards that are inserted in the add-on slots. In a conventional CPCI system that supports hot swappability of the front cards, the insertion and presence of non-hot swappable front cards are not detectable. Accordingly, there is a need for a CPCI system that can detect the presence of all front cards that are inserted in the add-on slots, whether hot swappable or not. This would allow the operating system to have a more accurate and complete view of the hardware configuration.

Figure 1:
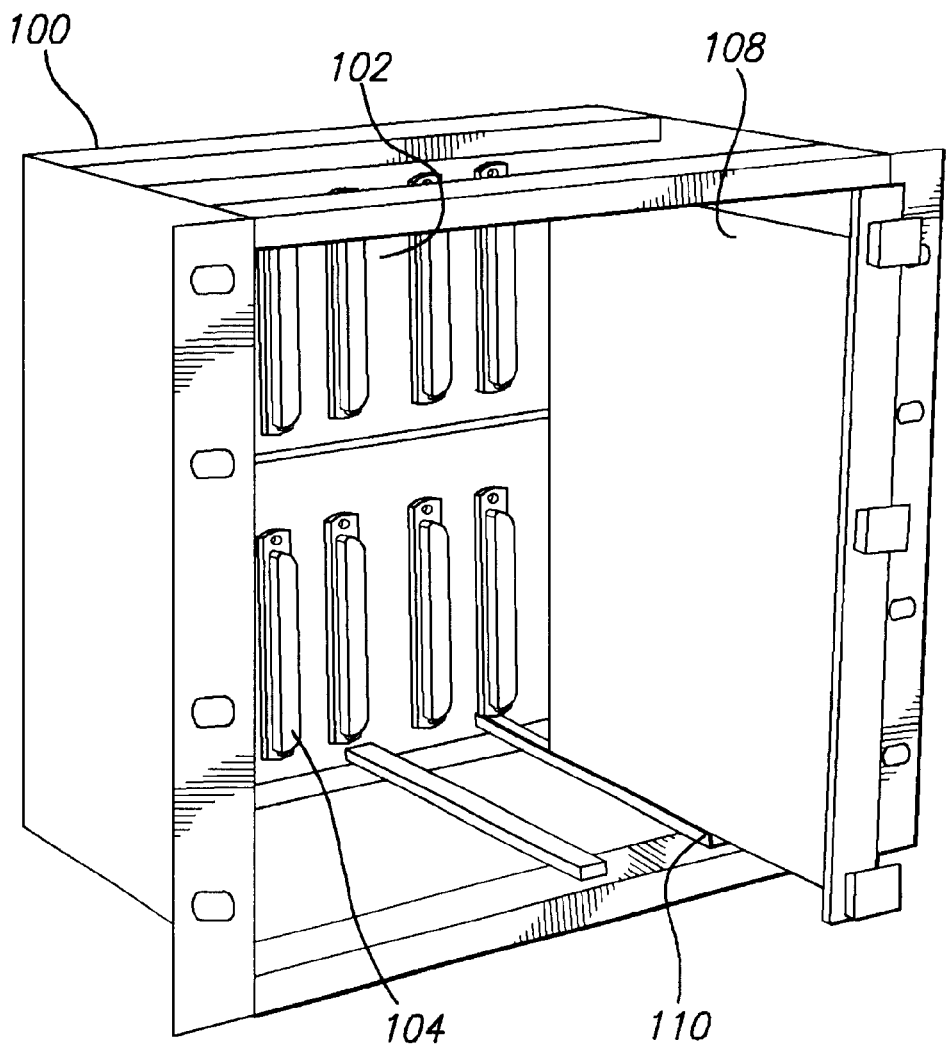
FIG. 1 is a perspective view of a conventional CPCI chassis system.

Referring to FIG. 1, there is shown a perspective view of a conventional CPCI chassis system. The chassis system 100 includes a CPCI circuit board referred to in the conventional CPCI system as a passive backplane 102 since the circuit board is located at the back of the chassis 100 and add-on cards (front cards) can only be inserted from the front of the chassis 100. On the front side of the backplane 102 are slots provided with connectors 104. In the conventional chassis system 100 that is shown, a 6U daughter card 108 is inserted into one of the slots and mates with a corresponding one of the connectors 104. For proper insertion of the daughter cards 108 into the slots, card guides 110 are provided. This conventional chassis system 100 provides front removable daughter cards and unobstructed cooling across the entire set of daughter cards 108.

Figure 2:
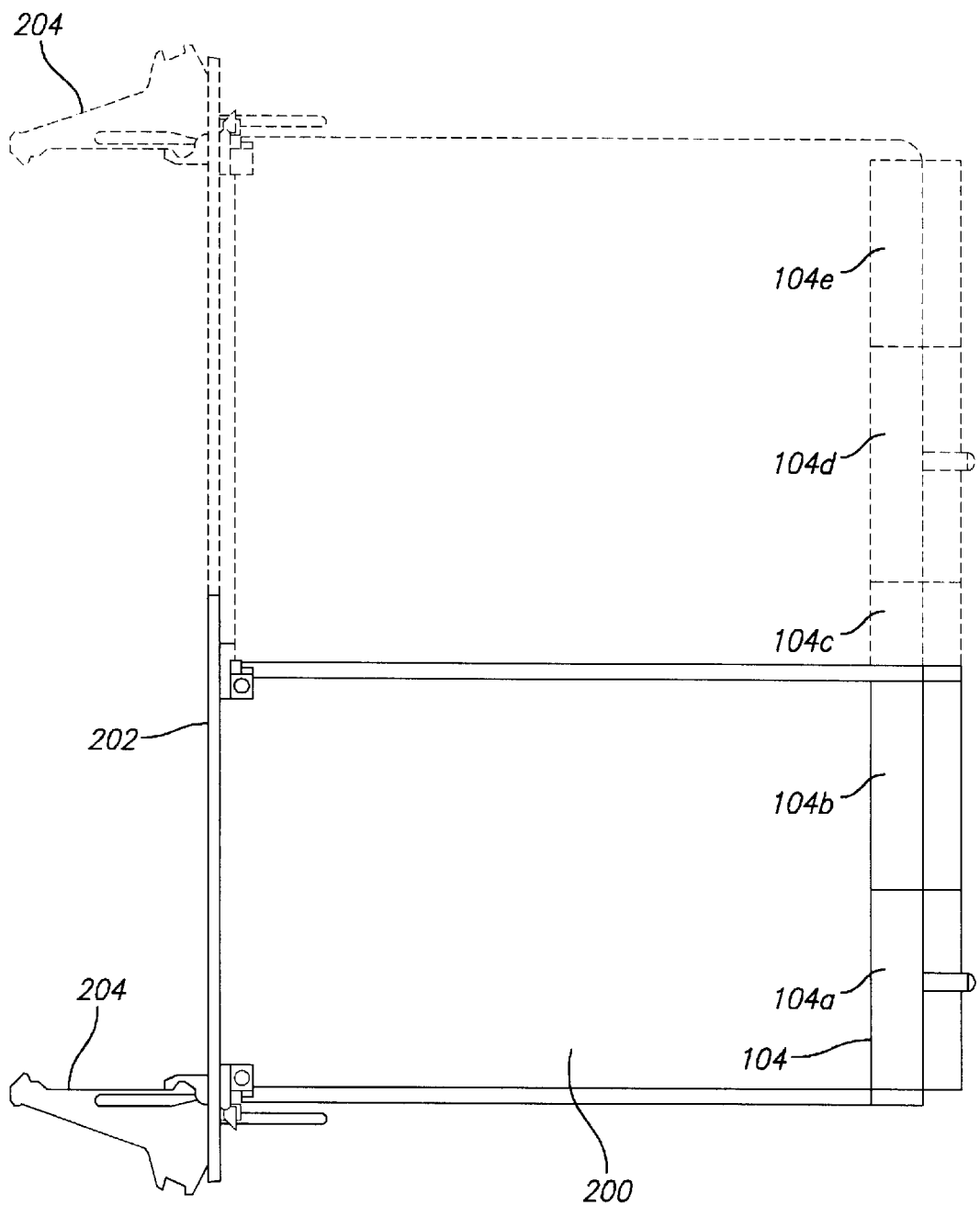
FIG. 2 shows the form factor that is defined for the CPCI daughter card.

Referring to FIG. 2, there is shown the form factor defined for the CPCI daughter card, which is based on the Eurocard industry standard. As shown in FIG. 2, the daughter card 200 has a front plate interface 202 and ejector/injector handles 204. The front plate interface 202 is consistent with Eurocard packaging and is compliant with IEEE 1101.1 or IEEE 1101.10. The ejector/injector handles should also be compliant with IEEE 1101.1. One ejector/injector handle 204 is used for 3U daughter cards, and two ejector/injector handles 204 are used for 6U daughter cards. The connectors 104a–104e of the daughter card 200 are numbered starting from the bottom connector 104a, and both 3U and 6U daughter card sizes are defined, as described below.

The dimensions of the 3U form factor are approximately 160.00 mm by approximately 100.00 mm, and the dimensions of the 6U form factor are approximately 160.00 mm by approximately 233.35 mm. The 3U form factor includes two 2 mm connectors 104a–104b, which is the minimum number of connectors that are required to accommodate a full 64 bit CPCI bus. Specifically, the 104a connectors are reserved to carry the signals required to support the 32-bit PCI bus, hence no other signals may be carried in any of the pins of this connector. Optionally, the 104a connectors may have a reserved key area that can be provided with a connector "key", which is a pluggable plastic piece that comes in different shapes and sizes, so that the add-on card can only mate with an appropriately keyed slot. The 104b connectors are defined to facilitate 64-bit transfers or for rear panel I/O in the 3U form factor. The 104c–104e connectors are available for 6U systems as shown in FIG. 1. The 6U form factor includes the two connectors 104a–104b of the 3U form factor, and three additional 2 mm connectors 104c–104e. In other words, the 3U form factor includes connectors 104a–104b, and the 6U form factor includes connectors 104a–104e. The three additional connectors 104c–104e of the 6U form factor can be used for secondary buses (i.e., Signal Computing System Architecture (SCSA) or MultiVendor Integration Protocol (MVIP) telephony buses), bridges to other buses (i.e., Virtual Machine Environment (VME) or Small Computer System Interface (SCSI)), or for user specific applications. Note that the CPCI specification defines the locations for all the connectors 104a–104e, but only the signal-pin assignments for the CPCI bus portion 104a and 104b are defined. The remaining connectors are the subjects of additional specification efforts, or can be user defined for specific applications, as described above.

Referring to FIG. 3, there is shown a front view of a conventional 3U backplane having eight slots with two connectors each. A CPCI system is composed of one or more CPCI bus segments, where each bus segment includes up to eight CPCI card slots. Each CPCI bus segment consists of one system slot 302, and up to seven peripheral slots 304a–304g. The CPCI daughter card for the system slot 302 provides arbitration, clock distribution, and reset functions for the CPCI peripheral cards on the bus segment. The peripheral slots 304a–304g may contain simple cards, intelligent slaves or PCI bus masters.

The connectors 308a, 308b have connector-pins 306 that project in a direction perpendicular to the backplane 300, and are designed to mate with the front side "active" daughter cards ("front cards"), and "pass-through" its relevant interconnect signals to mate with the rear side "passive" input/output (I/O) card(s) ("rear transition cards"). In other words, in the conventional CPCI system, the connector-pins 306 allow the interconnected signals to pass-through from the front cards to the rear transition cards.

Figure 4B:
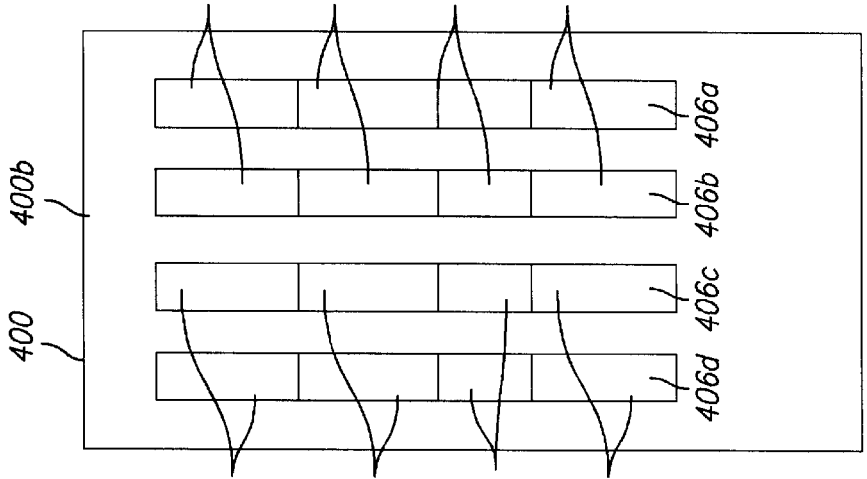
FIG. 4(b) shows a back view of a conventional CPCI backplane in the 6U form factor.
Figure 4A:
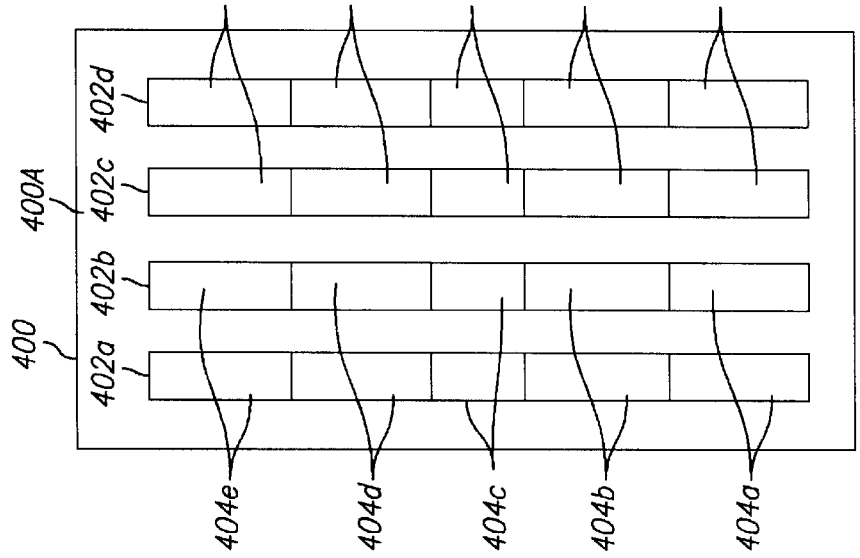
FIG. 4(a) shows a front view of a conventional CPCI backplane in the 6U form factor.

Referring to FIGS. 4(a) and 4(b), there are shown a front and back view of a conventional CPCI backplane in the 6U form factor, respectively. In FIG. 4(a), four slots 402a–402d are provided on the front side 400a of the backplane 400. In FIG. 4(b), four slots 406a–406d are provided on the back side 400b of the backplane 400. Note that in both FIGS. 4(a) and 4(b) only four slots are provided instead of eight slots as in FIG. 3. Further, it is important to note that each of the slots 402a–402d on the front side 400a has five connectors 404a–404e while each of the slots 406a–406d on the back side 400b has only four connectors 408b–408e. This is because, as in the 3U form factor of the conventional CPCI system, the 404a connectors are provided for 32 bit PCI and connector keying. Thus, they do not have I/O connectors to their rear. Accordingly, the front cards that are inserted in the front side slots 402a–402d only transmit signals to the rear transition cards that are inserted in the back side slots 406a–406d through front side connectors 404b–404e.

Figure 5:
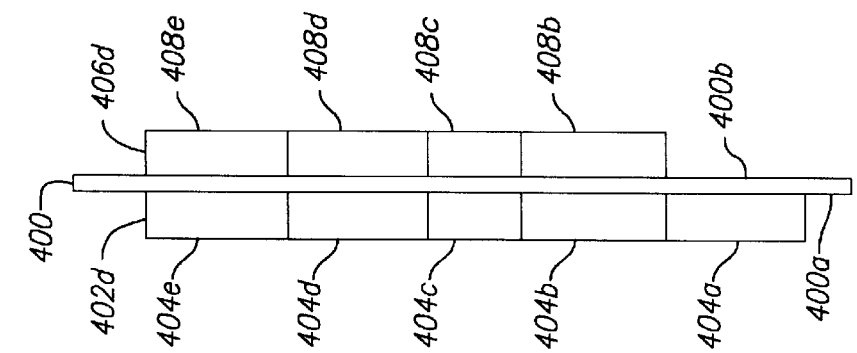
FIG. 5 shows a side view of the conventional backplane of FIGS. 4(a) and 4(b)

Referring to FIG. 5, there is shown a side view of the conventional backplane of FIGS. 4(a) and 4(b). As shown in FIG. 5, slot 402d on the front side 400a and slot 406d on the back side 400b are arranged to be substantially aligned so as to be back to back. Further, slot 402c on the front side 400a and slot 406c on the backside 400b are arranged to be substantially aligned, and so on. Accordingly, the front side connectors 404b–404e are arranged back-to-back with the back side connectors 408b–408e. Note that the front side connector 404a does not have a corresponding back side connector. It is important to note that the system slot 402a is adapted to receive the CPU front card, and the signals from the system slot 402a are then transmitted to corresponding connector-pins of the peripheral slots 402b–402d. Thus, the conventional CPCI system can have expanded I/O functionality by adding peripheral front cards in the peripheral slots 402b–402d.

FIGS. 6(a) and 6(b) illustrate a conventional pin out arrangement of the connectors in a CPCI system. Specifically, FIG. 6(a) shows a front view of a conventional pin out arrangement of the connectors of a slot. Referring to FIG. 6(a), there are shown connectors 404a–404e of slot 402d. The connector-pins are arranged in a column and row configuration. Each of the connectors 404a–404e have seven columns of pins, which are designated as Z, A, B, C, D, E, and F going from left to right. Each of the connectors 404a–404e also has twenty-two rows of connector-pins.

As shown in FIG. 6(a), all of the connector-pins in the Z and F columns are connected to a ground layer GND in the backplane. The connector-pins of the other columns A, B, C, D, and E are connected to various other CPCI signals including ground. Note that in FIG. 6(a), the connector-pins having XXX or YYY designations do not mean that those pins share the same signals, respectively. Instead, the XXX or YYY designations are provided to show that these connector-pins are defined to carry various CPCI signals that are not particularly relevant to the present invention, and thus are not specifically shown in FIG. 6(a). Note that the other slots 402a–402c have a similar pin out arrangement as shown in slot 402d of FIG. 6(a).

FIG. 6(b) shows a back view of a conventional pin out arrangement of the connectors of a slot. Referring to FIG. 6(b), there are shown connectors 408b–408e of slot 406d. Note that the back view shows only four connectors instead of five. This is because, as shown in FIGS. 4(a) and 4(b), the front side of the backplane has five connectors while the back side of the backplane has four connectors. Further, the column arrangement of the connector-pins is designated as F, E, D, C, B, A, and Z going from left to right. This is because the connector-pins of slots 402d and 406d are straight-pass through pins, and so the column designations are mirror images with respect to each other. For example, the connector-pin located at column A, row 2 of connector 404b is the same connector-pin located at column A, row 2 of connector 408b. Also, similar to FIG. 6(a), connector-pins located at columns F and Z in FIG. 6(b) are connected to a ground layer GND in the backplane. Likewise, connector-pins of columns A, B, C, D, and E are connected to various signals, as in FIG. 6(a).

More specifically, the Hot Swap/HA Specification defines the connector-pin located at column D, row 15 of connector 404(a) to be a BD_SELECT# pin. Other relevant connector-pins of connector 404a include a BD_HEALTHY# pin, which is located at column B, row 4, and a BD_RESET# pin, which is located at column C, row 5. The significance of these connector-pins in the Hot Swap/HA specification is discussed in more detail with reference to FIGS. 7(a) and 7(b) below.

Figure 7A:
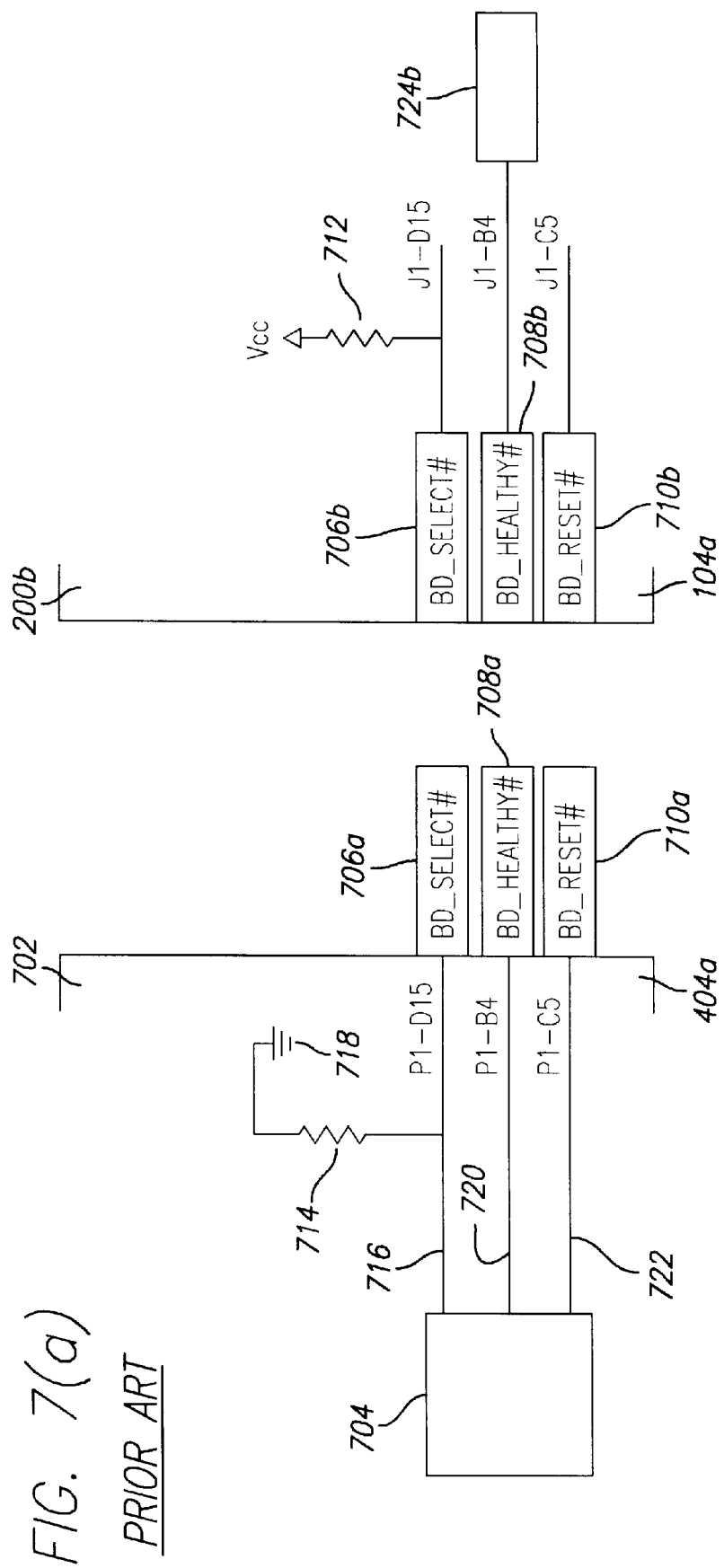
FIG. 7(a) shows a conventional hot swappable CPCI system for detecting the presence of a hot swappable front card.

FIG. 7(a) shows a conventional hot swappable CPCI system for detecting the presence of a hot swappable front card. Referring to FIG. 7(a), a CPCI backplane 702 has a connector 404a in one of its slots, and a hot swap controller 704 coupled to the backplane 702. The connector 404a has the BD_SELECT# 706a, BD_HEALTHY# 708a, and BD_RESET# 710a connector-pins, which are of male-type, connected to the hot swap controller 704. Note that the BD_SELECT# line 716 is connected to a "weak-pull-down" resistor 714 that is connected to a ground layer 718 in the backplane 702. A front card 200b has corresponding BD_SELECT# 706b, BD_HEALTHY# 708b, and BD_RESET# 710b connector-pins, which are of female-type, with the BD_SELECT# pin 706b being connected to a voltage source Vcc through a pull-up resistor 712. The BD_SELECT# line 716 is defined to provide a signal to the hot swap controller 704 such that the controller 704 knows whether a hot swappable front card 200b has been inserted in a particular slot. Further, the hot swap controller 704 performs the powering up/down of the hot swappable front card 200b using this line 716. The BD_HEALTHY# pin 708b is connected to an internal power supply 724b in the front card 200b such that the BD_HEALTHY# line 720 indicates to the hot swap controller 704 whether or not the board is defective. The BD_RESET# line 722 is used by the hot swap controller 704 to reset a front card 200b so that it remains in a back up mode. All of the above described functions of the BD_SELECT#, BD_HEALTHY#, and BD_RESET# lines are described in more detail below.

Specifically, when the hot swappable front card 200b is inserted into a slot of backplane 702 such that the connectors 404a and 104a mate, the BD_SELECT# pin 706a is pulled up to the voltage level of the BD_SELECT# pin 706b. This pull-up on the BD_SELECT# pin 706a is detected by the hot swap controller 704 such that the hot swap controller 704 senses that a hot swappable front card 200b has been inserted in the particular slot. The hot swap controller 704 then drives the BD_SELECT# line 716 low so as to allow the front card 200b to power up. Then, the hot swap controller 704 examines the BD_HEALTHY# line 720 to determine if the inserted front card 200b is healthy. This determination is made by sensing the voltage level from the internal power supply 724b. The hot swap controller 704 then uses the BD_RESET# line 722 to release the front card 200b from the reset mode to connect to the system. Alternatively, if the front card 200b is a back up board, then the BD_RESET# line 722 is used to maintain the front card 200b in the reset mode until backup is needed from the particular front card 200b.

Figure 7B:
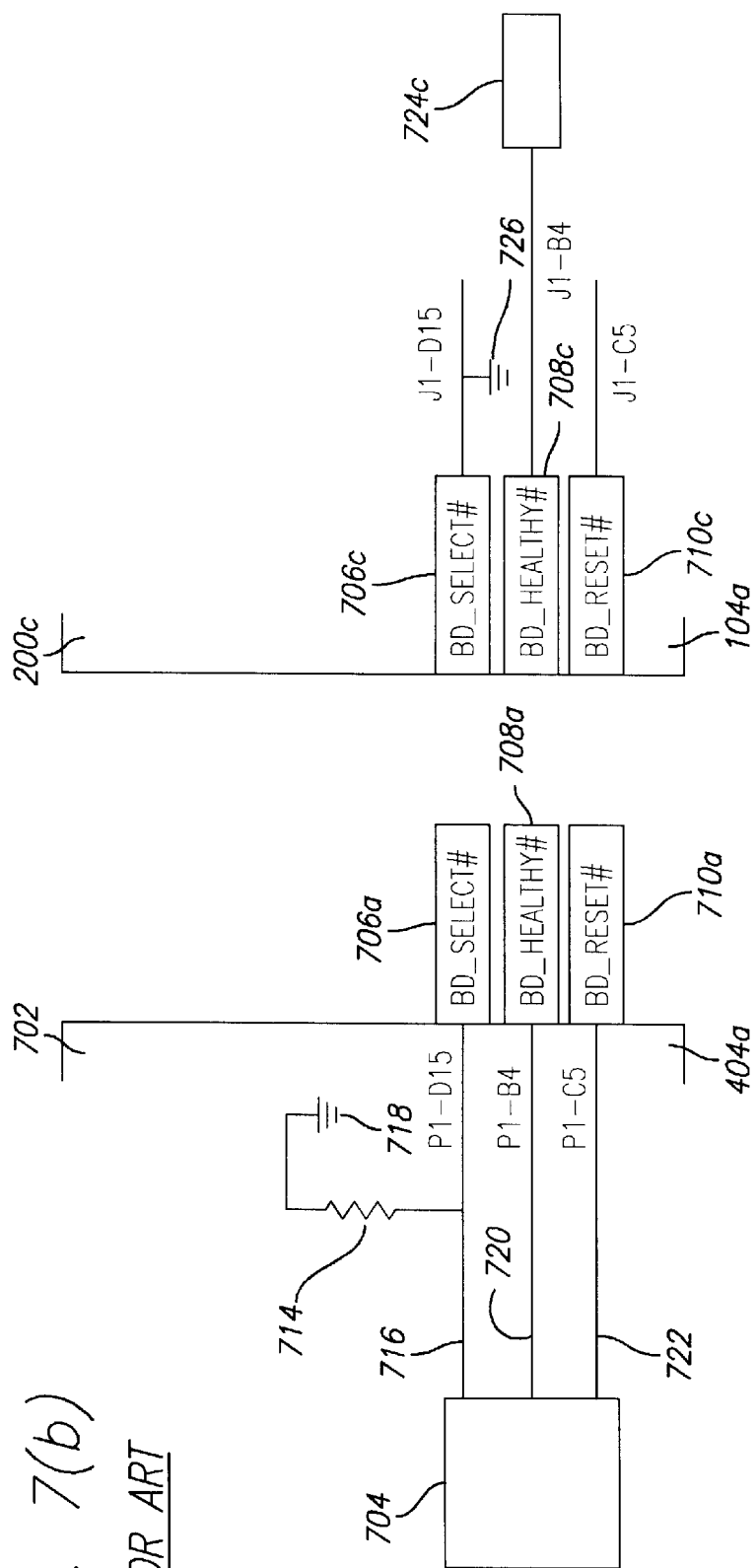
FIG. 7(b) shows a conventional hot swappable CPCI system for illustrating that the system cannot detect the presence of a non-hot swappable front card.

FIG. 7(b) shows a conventional hot swappable CPCI system for illustrating that the system cannot detect the insertion of a non-hot swappable front card. Referring to FIG. 7(b), note that a non-hot swappable front card 200c has corresponding BD_SELECT# 706c, BD_HEALTHY# 708c, and BD_RESET# 710c connector-pins, which are of female-type, with the BD_SELECT# pin 706c in the non-hot swappable front card 200c not connected to a pull-up resistor, but connected instead to a ground layer 726 in the front card 200c. It should also be appreciated that the BD_HEALTHY# pin 708c is again connected to an internal power supply 724c in the front card 200c such that the BD_HEALTHY# line 720 indicates to the hot swap controller 704 whether or not the board is defective. When the non-hot swappable front card 200c is inserted in a slot of the backplane 702 so that the connectors 404a and 104a mate, the BD_SELECT# pin 706a becomes grounded. The hot swap controller 704 senses that the BD_SELECT# pin 706a is at ground potential and so does not know that a non-hot swappable front card 200c has been inserted in the particular slot of backplane 702. This is because the BD_SELECT# line 716 is already connected to the "weak-pull-down" resistor 714 and cannot distinguish between the ground potential and the weak-pull-down on the resistor 714. The weak-pull-down on the resistor 714 typically involves a high value resistor that is connected to a ground layer 718 such that the hot swap controller 704 senses the logic level/voltage potential to be a "low". Accordingly, the hot swap controller 704 is not able to distinguish between the low level and the ground potential. Note that the ground layer 718 of the backplane 702 is at the same potential as the ground layer 726 of the front card 200c when the front card 200c is inserted in a slot of backplane 702. This is because the grounded connector-pins of the backplane 702 mate with the grounded connector-pins of the front card 200c so that they share a common ground. As described above, the hot swap controller 704 in conventional CPCI systems cannot detect the insertion of a non-hot swappable front card 200c in a particular slot. In contrast, the present invention reliably detects the presence of all cards, 200b, 200c, whether hot swappable or not.

FIG. 8(a) shows a front view of the pin out arrangement of the connectors of a CPCI system according to an embodiment of the invention. Referring to FIG. 8(a), there are shown connectors 404a–404e of slot 402d. The connector-pins are arranged in a column and row configuration. Each of the connectors 404a–404e have seven columns of pins, which are designated as Z, A, B, C, D, E, and F going from left to right. The connectors 404a–404e each also have twenty-two rows.

As shown in FIG. 8(a), all of the connector-pins in column Z and all of the connector-pins in column F, except for one, are connected to a ground layer GND in the backplane. Specifically, the connector-pin located in column F, row 1 of connector 404a of FIG. 8(a) is designated as a BD_DETECT# pin, and is used to detect the insertion of a front card, whether hot swappable or not. The connector-pins of the other columns A, B, C, D, and E are defined for various CPCI signals. Note that in FIG. 8(a) as in FIG. 6(a), the connector-pins having XXX or YYY as the defined signals do not mean that those pins share the same signals, respectively. Instead, the XXX or YYY designations are provided to show that these connector-pins are connected to various CPCI signals that are not particularly relevant to the present invention, and thus are not specifically shown in FIG. 8(a). Note that the other slots 402a–402c have a similar pin out arrangement as shown in slot 402d of FIG. 8(a).

FIG. 8(b) shows a modification of the pin out arrangement of FIG. 8(a) according to another embodiment of the invention. Referring to FIG. 8(b), the arrangement of the connector-pins are exactly the same as the arrangement shown in FIG. 8(a), except for the key area located in connector 404a. As illustrated in FIG. 8(b), the 404a connectors may have an optional key area that is provided with a connector "key", which is a pluggable plastic piece that comes in different shapes and sizes, so that only an appropriately keyed front card can mate with a particular slot.

FIG. 9(a) shows a front card having a pin out arrangement corresponding to the pin out arrangement shown in FIG. 8(a). The pin out arrangement of the front card 200 is essentially a mirror image of the pin out arrangement shown in FIG. 8(a), except that the connector-pin located at column F, row 1, of connector 104a is connected to a ground layer in the front card. FIG. 9(b) shows a front card having a pin out arrangement corresponding to the pin out arrangement of FIG. 8(b). This arrangement is the same as the arrangement shown in FIG. 9(a), except for the addition of the key area.

Figure 10A:
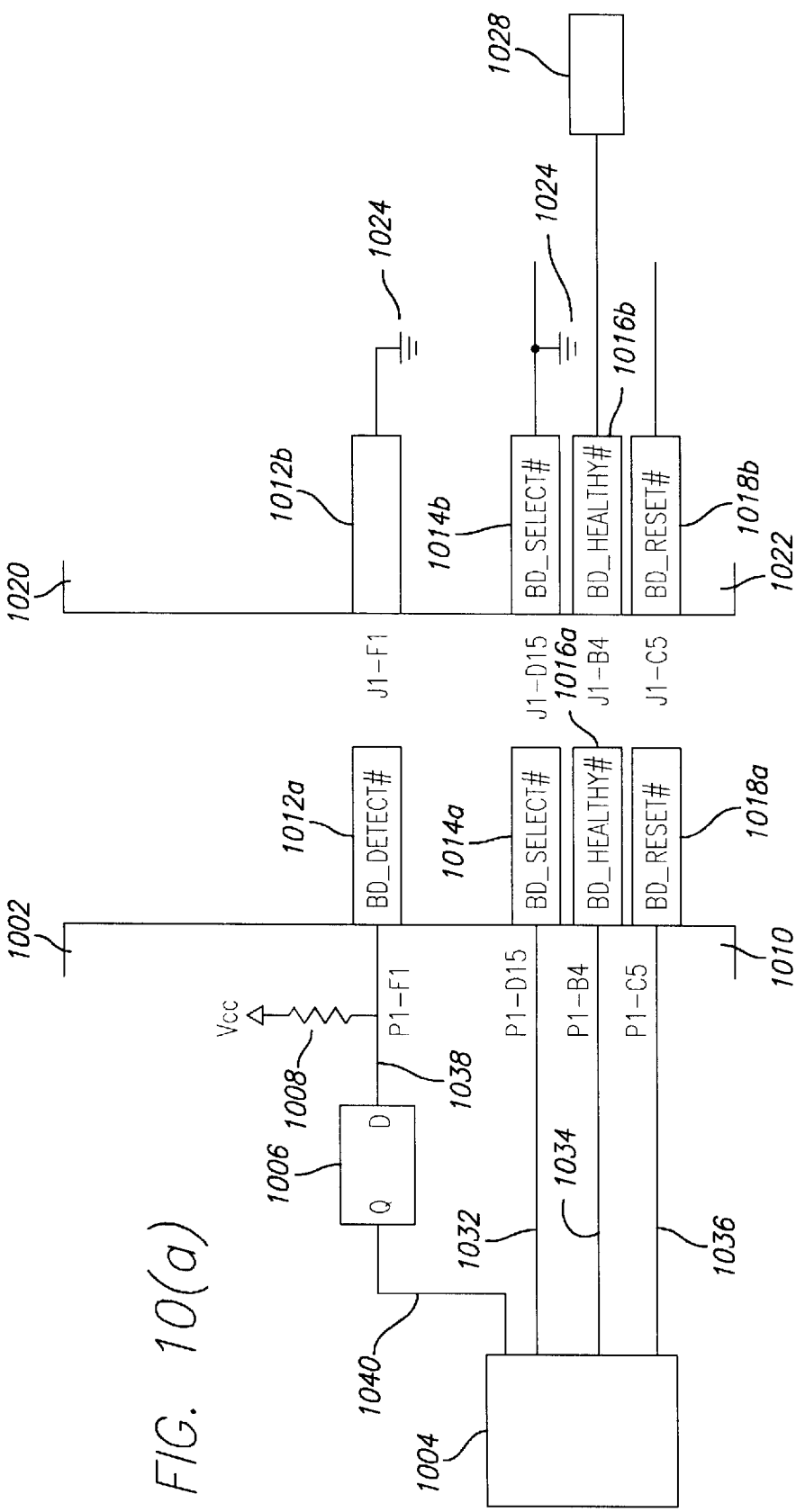
FIG. 10(a) shows a hot swappable CPCI system for detecting a non-hot swappable front card according to an embodiment of the invention.

FIG. 10(a) shows a hot swappable CPCI system for detecting a non-hot swappable front card according to an embodiment of the invention. Referring to FIG. 10(a), a CPCI backplane 1002 has a hot swap controller 1004, a register 1006, a pull-up resistor 1008 connected to a voltage source Vcc, and a connector 1010 in one of its slots. The connector 1010 has the BD_SELECT# 1014a, BD_HEALTHY# 1016a, and BD_RESET# 1018a connector-pins, which are of male-type, connected to the hot swap controller 1004. The BD_DETECT# pin 1012a, which is of male-type, is connected to the register 1006 via the D input line 1038. The register 1006 has its D input line 1038 connected to a voltage source Vcc through the pull-up resistor 1008, and the Q output line 1040 of the register 1006 is connected to the hot swap controller 1004.

A front card 1020 has a connector 1022 with corresponding BD_DETECT# 1012b, BD_SELECT# 1014b, BD_HEALTHY# 1016b, and BD_RESET# 1018b connector-pins, which are of female-type. Both the BD_DETECT# 1012*b* and BD_SELECT# 1014*b* pins are connected to a ground layer 1024 in the front card 1020. Note that the BD_SELECT# pin 1014*b* is connected to the ground layer 1024 since the front card 1020 is not a hot swappable card.

In the present embodiment, when the D input to the register 1006 is high, which occurs when a front card 1020 is not present in the particular slot, then the Q output is high. When the D input of the register 1006 is low or ground, then the Q output is low. Accordingly, the hot swap controller 1004 detects the insertion of a front card when the Q output is low. For example, when the non-hot swappable front card 1020 is inserted into a slot of backplane 1002 such that the connectors 1010 and 1022 mate during a power-off state of the system, then when the CPCI system is turned on, the D input line 1038 is pulled-down to a ground potential since the BD_DETECT# pin 1012*b* in the front card 1020 is connected to the ground layer 1024. This pull-down on the voltage level of the D input line 1038 is input to the register 1006. The hot swap controller then detects that the Q output line 1040 of the register 1006 is low, and senses that a front card has been inserted in that particular slot. Accordingly, in the present invention, the hot swap controller 1004 is able to detect the insertion of the non-hot swappable front card. Note that the present invention detects the presence of non-hot swappable cards during the initial power-up since the non-hot swappable cards cannot be inserted unless the system is in an off state.

In another aspect of the invention, the hot swap controller is able to distinguish between the presence of a hot swappable card and a non-hot swappable card. This is because if the BD_SELECT line 1032 is high, then the hot swap controller 1004 knows that a hot swappable card has been inserted. If the BD_SELECT# line 1032 is low and the Q output line 1040 from the register 1006 is low, then the hot swap controller 1004 senses that a non-hot swappable card is present. Note that in the embodiment of FIG. 10(*a*), a CPU card (not shown) may include a stand-alone hot swap controller in the backplane. Further, the hot swap controller shares this information with the operating system of the CPU (not shown) so that a more accurate hardware configuration is known to the operating system.

Figure 10B:
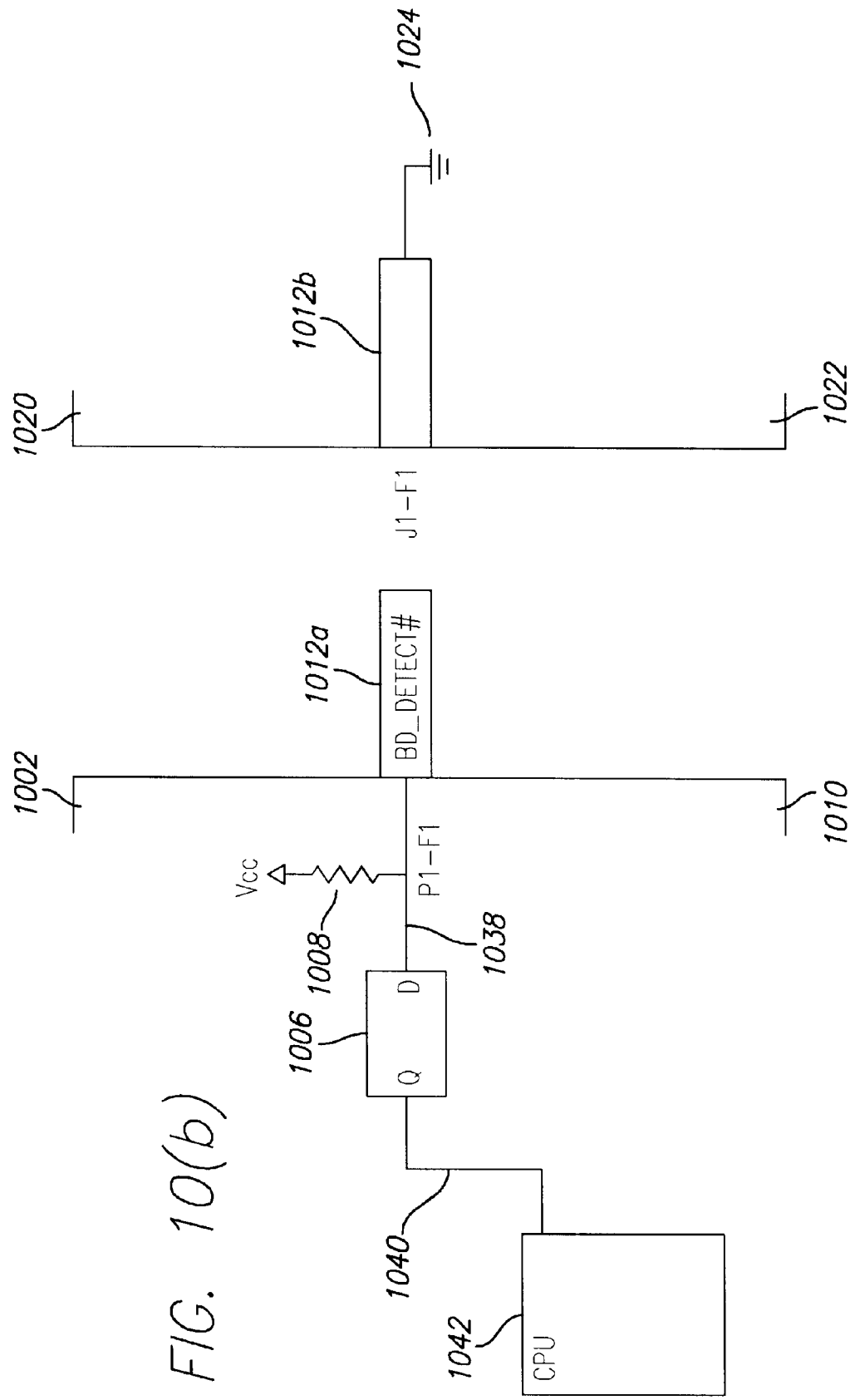
FIG. 10(b) shows a non-hot swappable CPCI system for detecting a non-hot swappable front card according to an embodiment of the invention.
Figure 10C:
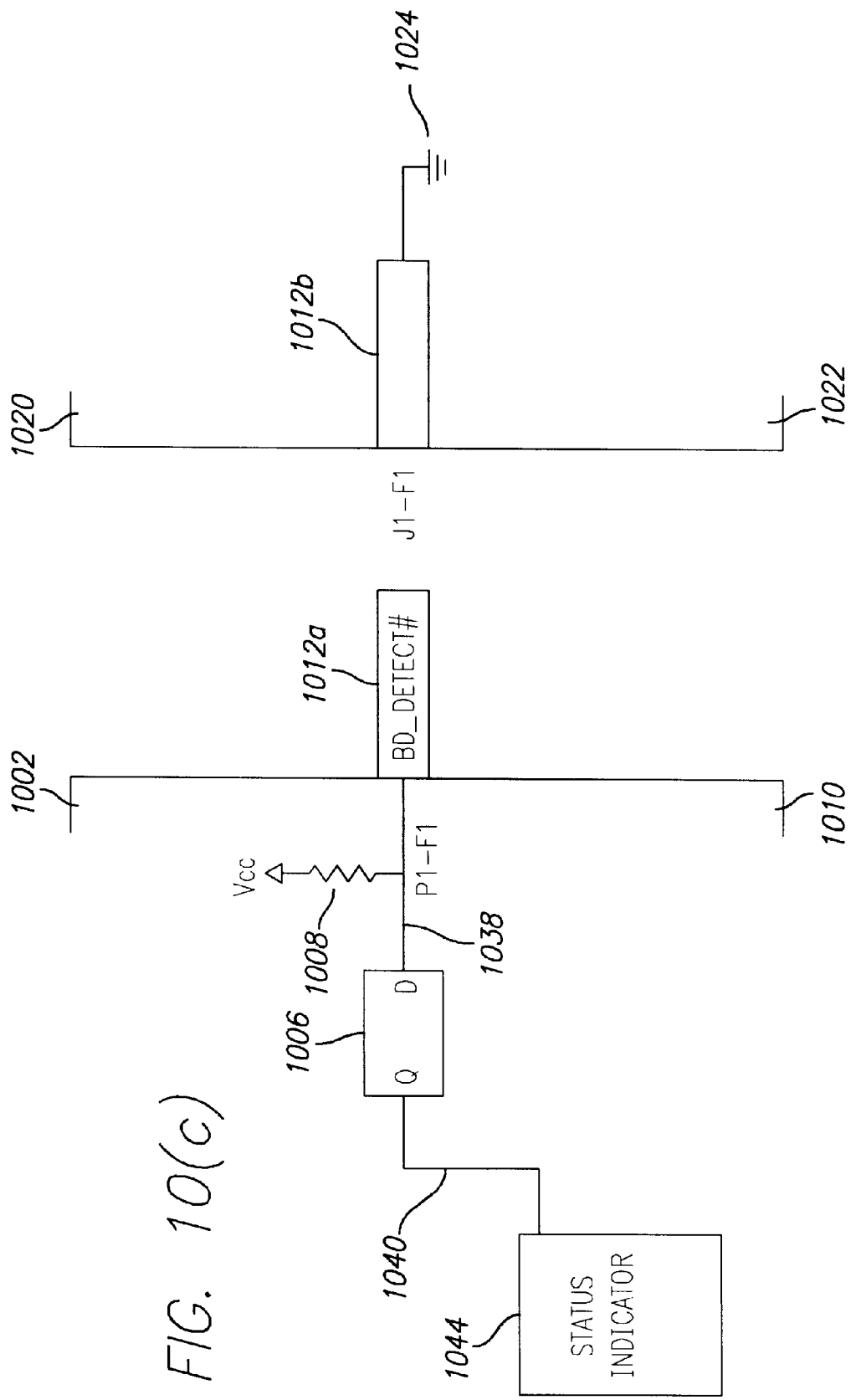
FIG. 10(c) shows a non-hot swappable CPCI system for detecting a non-hot swappable front card according to another embodiment of the invention.

FIG. 10(*b*) shows a non-hot swappable CPCI system for detecting a non-hot swappable front card according to an embodiment of the invention. Referring to FIG. 10(*b*), instead of hot swap controller, a CPU 1042 receives the Q output signal from the register 1006. Similar to the hot swap controller 1004 of FIG. 10(*a*), a low on the Q output line 1040 indicates to the CPU 1042 the insertion of a front card 1020 while a high on the Q output line 1040 represents that the particular slot is empty. In the present embodiment, the CPU receives the Q output signal so that the operating system has a more accurate view of the hardware configuration in the system.

FIG. 10(*c*) shows a non-hot swappable CPCI system for detecting a non-hot swappable front card according to another embodiment of the invention. Referring to FIG. 10(*c*), instead of a CPU, a status indicator 1044 receives the Q output signal from the register 1006. Similar to the embodiments of FIGS. 10(*a*) and 10(*b*), a low on the Q output line 1040 indicates the insertion of a front card 1020 while a high on the Q output line 1040 represents that the particular slot is empty. The status indicator 1044 receives this information and provides the status of the slots of the system to a user. Typically, the status indicator 1044 is a front panel LED light indicator having corresponding light indicators to light when a board is present in the system.

Figure 11:
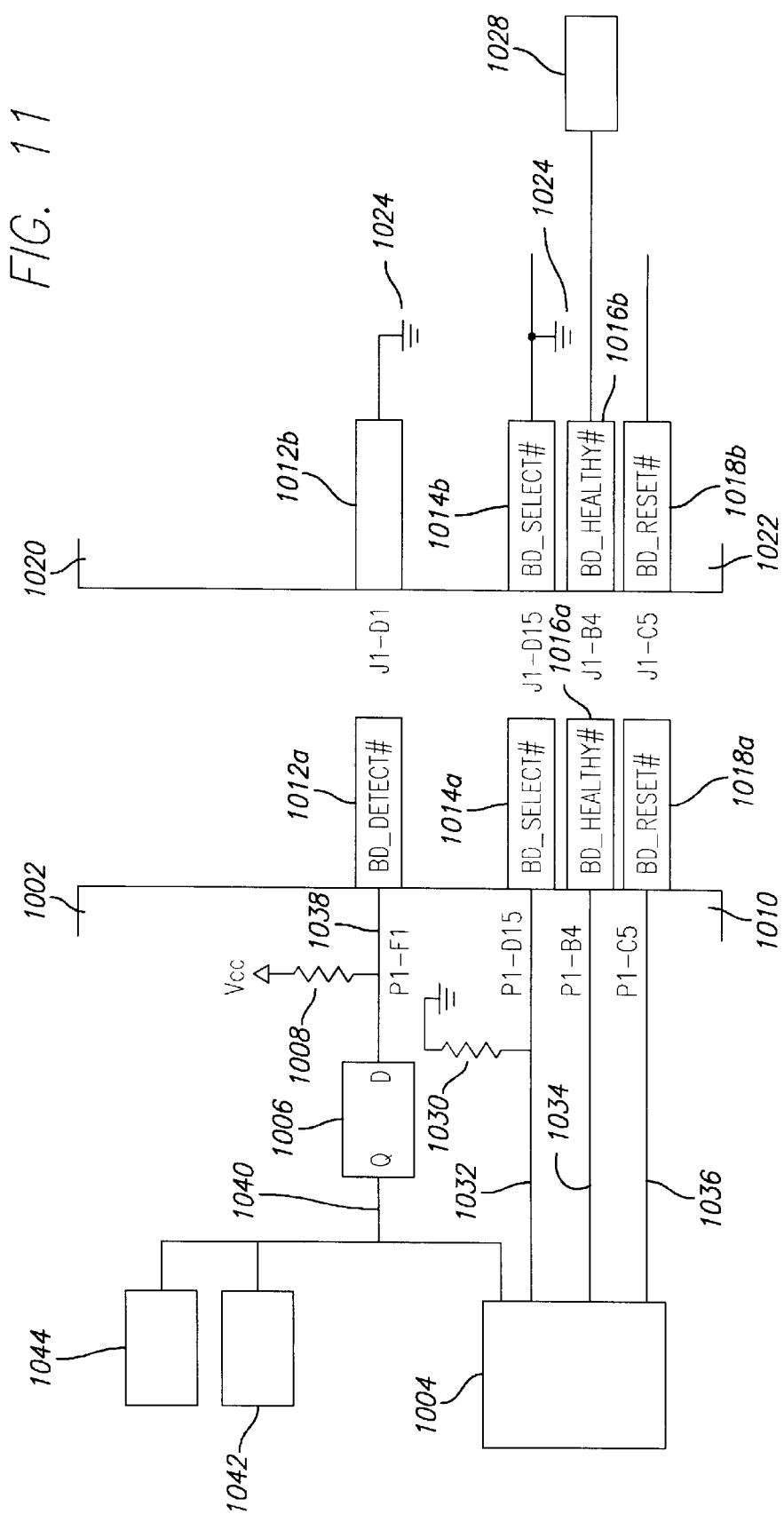
FIG. 11 shows a hot swappable CPCI system including a CPU and a status indicator according to an embodiment of the invention.

FIG. 11 shows a hot swappable CPCI system including a CPU and status indicator according to an embodiment of the invention. Referring to FIG. 11, the backplane 1002 includes the hot swap controller 1004, the CPU 1042 and the status indicator 1044. The register 1006 acts as a buffer such that the signal that is input to its D input is stored for use by the hot swap controller, CPU and status indicator. As described above, a low on the Q output line 1040 indicates the presence of a front card in the particular slot while a high on the Q output line 1040 indicates the absence of a front card in the particular slot. The signal from the Q output line 1040 is used by the hot swap controller, CPU and the status indicator in the manner described above with respect to FIGS. 10(*a*)–10(*c*), respectively.

FIG. 12 shows a plurality of slots having respective BD_DETECT# pins connected to respective inputs of a register for detecting the presence of front cards according to an embodiment of the invention. Referring to FIG. 12, slots 1201*a*, 1201*b* each have the connector 404*a* on a backplane 1200. The connector-pins designated as 1202*a*, 1202*b* are the BD_DETECT# pins. Signal trace lines 1204*a*, 1204*b* connect the pins 1202*a*, 1202*b* to the D inputs of the register 1006, respectively. The register 1006 has corresponding Q output lines 1206*a*, 1206*b*, that transmit the output signals to the hot swap controller 1004, CPU 1042, and status indicator 1044. Note that in the present embodiment, only two signal lines 1204*a*, 1204*b* are input to the register 1006 since only two slots 402*a*, 402*d* are shown. However, if more or less slots are provided on the backplane 1200, then an equal number of signal lines should be provided as inputs to the register 1006 and outputs from the register 1006 to the hot swap controller, CPU and status indicator. Further, in the embodiment of FIG. 12, the register 1006 is disposed on an area of the backplane 1200. However, the register 1006 may be provided as a front card that is inserted in a slot of the backplane. For example, FIG. 13 shows a side view of a register in the form of a front card 1300 inserted in a slot 1302 of the backplane 1304.

Having thus described embodiments of the present invention, it should be apparent to those skilled in the art that certain advantages of the within system have been achieved. It should also be appreciated that various modifications, adaptations, and alternative embodiments thereof may be made within the scope and spirit of the present invention. For example, a reliable card detection system in a CPCI system has been illustrated, but it should be apparent that the inventive concepts described above would be equally applicable to other types of busses and computer systems, whether hot swappable or not. The invention is further defined by the following claims.

What is claimed is:

1. A computer system including a circuit board, said system comprising:

a slot coupled to a front side of said circuit board;

a plurality of connectors affixed to said circuit board in alignment with said slot, said plurality of connectors including a first connector;

a plurality of connector-pins extended in a direction substantially perpendicular to and away from said circuit board, and having a column and row arrangement within said connectors, said first connector including first and second connector-pins among said plurality of connector-pins;

a register having an input line and an output line, said input line connected to a voltage source through a pull-up resistor, said first connector-pin connected to said input line of said register; and a circuit having an input terminal and connected to said first connector-pin through said register, said register connected to said input terminal of said circuit via said output line of said register, wherein depending on a voltage level of said first connector-pin, said register transmits one of a high and low signal to said input terminal of said circuit, said circuit detects a presence of a front card in said slot based on said one of high and low signal;

wherein said circuit is at least one of a hot swap controller, a CPU, and a status indicator and wherein said hot swap controller is connected to said second connector-pin via a signal line, said hot swap controller adapted to distinguish between the insertion of a hot swappable front card and a non-hot swappable front card depending on said one of high and low signal and a voltage level of said second connector-pin.

2. The computer system of claim 1, wherein said register is inserted into a slot of said circuit board and is connected with said circuit board via said input line of said register through said first connector-pin.

3. The computer system of claim 1, wherein said front card comprises third and fourth connector-pins for mating with said first and second connector-pins.

4. The computer system of claim 3, wherein said front card comprises a non-hot swappable front card, and said third and fourth connector-pins are connected to a ground layer of said front card.

5. The computer system of claim 3, wherein said front card comprises a hot swappable front card, and said third connector-pin is connected to a ground layer of said front card and said fourth connector-pin is connected to a voltage source through a pull-up resistor.

6. The computer system of claim 1, wherein said column and row arrangement of said connector-pins include first and second columns of connector-pins, said connector-pins of said first and second columns connected to a ground layer of said circuit board, except for said first connector-pin.

7. The computer system of claim 6, wherein said connector-pins in said first and second columns are connected to said ground layer, except for those connector-pins located in a key area, said key area comprising a connector key that can only mate with an appropriate front card.

8. The computer system of claim 1, wherein said first connector further comprises fifth and sixth connector-pins, and said fifth and sixth connector-pins are connected via signal lines to said circuit.

9. A circuit board having a front side, said circuit board comprising:

a plurality of slots coupled to said front side of said circuit board;

a plurality of connectors disposed within each of said plurality of slots and including a first connector in each of said slots, said respective first connectors of said slots including a first connector-pin and a second connector-pin;

a plurality of connector-pins disposed in an arrangement of a plurality of columns and rows in each of said connectors, said plurality of columns including first and second columns, said connector-pins in said first and second columns connected to a ground layer of said circuit board, except for said first connector-pins in said first connectors;

a input/output device having a plurality of input lines and output lines, each of said input lines connected to a voltage source through a pull-up resistor, and said first connector-pins in each of said slots connected to said input/output device via said respective input lines; and a circuit having a plurality of input terminals and connected to said first connector-pins through said input/output device, and said input terminals of said circuit being connected to said output lines of said input/output device, wherein depending on voltage levels of said respective first connector-pins, said input/output device transmits respective signals to said corresponding input terminals of said circuit, said circuit detects a presence of a front card in corresponding ones of said slots depending on said respective signals;

wherein said circuit is a hot swap controller, said hot swap controller being connected to said second connector-pins via respective signal lines, said hot swap controller adapted to distinguish between the insertion of a hot swappable front card and a non-hot swappable front card in said slots depending on respective voltage levels on said first and second connector-pins of said respective slots.

10. The circuit board of claim 9, wherein said first and second columns are located at an outermost column of said plurality of columns of said plurality of connectors.

11. The circuit board of claim 9, wherein corresponding ones of said first connector-pins are at one of a positive voltage and negative voltage with respect to a potential of said ground layer when a front card is not present in corresponding ones of said slots.

12. The circuit board of claim 9, wherein corresponding ones of said first connector-pins are connected to a ground layer when said front card is inserted in corresponding ones of said slots.

13. The circuit board of claim 9, wherein said input/output device is configured as a front card, said front card mated with one of said slots of said circuit board.

14. The circuit board of Claim 9, wherein said input/output device comprises a register.

15. A computer system including a circuit board, said system comprising:

a slot coupled to a front side of said circuit board;

a plurality of connectors affixed to said circuit board in alignment with said slot, said plurality of connectors including a first connector;

a plurality of connector-pins extended in a direction substantially perpendicular to and away from said circuit board, and having a column and row arrangement within said connectors, said first connector including first and second connector-pins among said plurality of connector-pins;

a register having an input line and an output line, said input line connected to a voltage source through a pull-up resistor, said first connector-pin connected to said input line of said register; and a circuit having an input terminal and connected to said first connector-pin through said register, said register connected to said input terminal of said circuit via said output line of said register, wherein depending on a voltage level of said first connector-pin, said register transmits one of a high and low signal to said input terminal of said circuit, said circuit detects a presence of a front card in said slot based on said one of high and low signal, wherein said circuit can distinguish between the presence of a hot swappable front card and a non-hot swappable front card.

16. The computer system of claim 15, wherein said circuit further comprises a hot swap controller for distinguishing between the presence of a hot swappable front card and a non-hot swappable front card.

17. The computer system of claim 15, wherein said circuit further comprises a hot swap controller connected to said second connector-pin via a signal line, said hot swap controller distinguishing between the presence of a hot swappable front card and a non-hot swappable front card based on said one of high and low signal and a voltage level of said second connector-pin.

18. A circuit board having a front side, said circuit board comprising:
- a plurality of slots coupled to said front side of said circuit board;
- a plurality of connectors disposed within each of said plurality of slots and including a first connector in each of said slots, said respective first connectors of said slots including a first connector-pin and a second connector-pin;
- a plurality of connector-pins disposed in an arrangement of a plurality of columns and rows in each of said connectors, said plurality of columns including first and second columns, said connector-pins in said first and second columns connected to a ground layer of said circuit board, except for said first connector-pins in said first connectors;
- a input/output device having a plurality of input lines and output lines, each of said input lines connected to a voltage source through a first pull-up resistor, and said first connector-pins in each of said slots connected to said input/output device via said respective input lines; and
- a circuit having a plurality of input terminals and connected to said first connector-pins through said input/output device, and said input terminals of said circuit being connected to said output lines of said input/output device, wherein depending on voltage levels of said respective first connector-pins, said input/output device transmits respective signals to said corresponding input terminals of said circuit, said circuit detects a presence of a front card in corresponding ones of said slots depending on said respective signals;

wherein said front card comprises at least one of a hot swappable front card and a non-hot swappable front card, wherein said hot swappable front card has a second pull-up resistor located within said hot swappable front card, and wherein said first pull-up resistor is not located within said hot swappable front card.

19. The circuit board of claim 18, wherein said circuit distinguishes between the presence of said hot swappable front card and said non-hot swappable front card.

20. The circuit board of claim 18, wherein said circuit comprises at least one of a hot swap controller, a CPU, and a status indicator.

* * * * *